(12) United States Patent
Minota

(10) Patent No.: US 7,347,633 B2
(45) Date of Patent: Mar. 25, 2008

(54) OPTICAL MODULE CAPABLE OF FACILITATING RELEASE FROM LOCKING STATE WITH CAGE WHICH ACCOMMODATES OPTICAL MODULE

(75) Inventor: Yuji Minota, Tokyo (JP)

(73) Assignee: NEC Corporation, Tokyo (JP)

( * ) Notice: Subject to any disclaimer, the term of this patent is extended or adjusted under 35 U.S.C. 154(b) by 34 days.

(21) Appl. No.: 10/852,112

(22) Filed: May 25, 2004

(65) Prior Publication Data

US 2004/0240792 A1 Dec. 2, 2004

(30) Foreign Application Priority Data

May 30, 2003 (JP) ............... 2003-154705

(51) Int. Cl.
G02B 6/36 (2006.01)
(52) U.S. Cl. .......................................... 385/92; 385/53
(58) Field of Classification Search ............ 385/50–55, 385/76, 139, 147, 72, 78, 92; 439/534, 131, 439/341, 342
See application file for complete search history.

(56) References Cited

U.S. PATENT DOCUMENTS

| 6,081,647 | A  | * | 6/2000 | Roth et al. ................... 385/139 |
| 6,186,670 | B1 | * | 2/2001 | Austin et al. ................. 385/55 |
| 6,276,839 | B1 | * | 8/2001 | De Marchi ................... 385/53 |
| 6,447,170 | B1 | * | 9/2002 | Takahashi et al. ............ 385/53 |
| 6,508,755 | B1 | * | 1/2003 | Ravins et al. ................. 600/8 |
| 6,533,603 | B1 | * | 3/2003 | Togami ....................... 439/372 |
| 6,550,977 | B2 | * | 4/2003 | Hizuka ........................ 385/55 |
| 6,685,362 | B2 | * | 2/2004 | Burkholder et al. .......... 385/78 |
| 6,726,369 | B1 | * | 4/2004 | Bates et al. ................... 385/53 |
| 2002/0150344 | A1 | | 10/2002 | Chiu et al. |
| 2002/0167793 | A1 | | 11/2002 | Branch et al. |
| 2004/0076377 | A1 | * | 4/2004 | Mizukami et al. ............ 385/77 |

FOREIGN PATENT DOCUMENTS

| DE | 100 55 683 A1 | 5/2002 |
| EP | 1 477 834 A1 | 11/2004 |
| JP | 7-231296 | 8/1995 |
| JP | 3002691 | 11/1999 |
| JP | 2002-536699 | 10/2002 |

* cited by examiner

*Primary Examiner*—Ellen E. Kim
(74) *Attorney, Agent, or Firm*—Young & Thompson

(57) ABSTRACT

An optical module comprises a case having a connection port for connection with an external optical fiber cable connector, and a locking member for locking the case in a cage for accommodating the case. The locking member is configured to lock the case in the cage when a connector is connected to the connection port after the case has been inserted into the cage up to a predetermined position, and to unlock the case from the cage when the connector is disconnected from the connection port. According to this optical module, the case can be locked in the cage through a simple operation of inserting the connector into the connection port after the case has been inserted into the cage.

18 Claims, 13 Drawing Sheets

Partially enlarged view of portion A

Partially enlarged view of portion B

OPTICAL MODULE CAPABLE OF FACILITATING RELEASE FROM LOCKING STATE WITH CAGE WHICH ACCOMMODATES OPTICAL MODULE

BACKGROUND OF THE INVENTION

1. Field of the Invention

The present invention relates to an optical module for use in optical communications. More particularly, the present invention relates to an optical module which can be locked in a cage for accommodating the case of the optical module.

2. Description of the Related Art

One of conventionally known optical modules for use in optical communications is an optical transceiver which comprises a light emitting element and a light receiving element for performing opto-electric conversion to make communications through optical fibers.

One type of such optical transceivers comprises an optical unit, including a light emitting element and a light receiving element, contained in a case, and is structured for removable accommodation in a cage mounted on a substrate. The cage has a socket mounted on the substrate, such that the optical transceiver plugged into the cage causes its connection terminals to come into connection with the socket. The optical transceiver thus constructed converts an optical signal communicated to/from an optical fiber to an electric signal communicated to/from the substrate, and vice versa to enable optical communications.

However, if an optical transceiver is withdrawn from the cage during the operation of the optical transceiver, a communication device including the optical transceiver can fail, needless to say that a communication is interrupted in the middle. To prevent such a trouble, the optical transceiver must be securely fixed within the cage at least during its operation.

In recent years, an industrial standardization organization has developed a standard called MSA (MultiSource Agreement) for SFP (Small Form-factor Pluggable) transceiver, by way of example, for making optical transceivers provided from respective companies compatible with one another. MSA defines the shape and dimensions of SFP transceivers and cages for accommodating the SFP transceivers. According to the SFP MSA standard, an optical transceiver is provided with a protrusive latch formed on a bottom surface thereof, while a cage is provided with a spring plate formed with a retaining hole therethrough for retaining the latch therein, so that when the optical transceiver is inserted into the cage, the latch of the optical transceiver can fit into the retaining hole of the cage to lock the optical transceiver in the cage. On the other hand, for removing the optical transceiver from the cage, any member must be used to release the latch from the retaining hole of the spring plate to unlock the optical transceiver from the cage.

FIG. 1 is a perspective view illustrating a conventional optical transceiver disclosed in U.S. Pat. No. 6,434,015 with its bottom surface oriented upward.

The conventional optical transceiver illustrated in FIG. 1 comprises housing 101 provided for accommodating a light emitting element and a light receiving element and formed with latch 114; and ejector 170 for removing latch 114 from a retaining hole (not shown) of a cage. Ejector 170 is arranged in an ejector sheet formed in lower portion 111 of housing 101, such that depression onto push plate 179 arranged at the rear end of ejector 170 enables the leading end of ejector 170 to extend to the vicinity of latch 114 from the interior of the ejector sheet. When the leading end of ejector 170 is protruded while latch 114 of the optical transceiver is retained in the retaining hole formed through the spring plate of the cage, the spring plate is bent to release latch 114 from the retention by the retaining hole.

Thus, this optical transceiver can be withdrawn from the cage by pushing push plate 179 of ejector 170 in a direction indicated by an arrow A in FIG. 1 to protrude the leading end thereof to the vicinity of latch 114, and releasing latch 114 from the retention by the retaining hole formed through the spring plate of the cage.

Another optical module has been also proposed by the present applicant for permitting the user to remove the optical module from a cage through simple operations and for installing a plurality of the optical modules in a single communication device at a higher density (refer to the Japanese patent application No. JP-2002-334967-A filed by the present applicant).

FIG. 2 is a diagram illustrating an optical module described in the patent application JP-2002-334967-A. The optical module described in the prior application has a locking mechanism which comprises locking member 204 swingably attached to case 201 and having latch 204d for retention in retaining hole 210a formed in cage 210; and lever 203 for moving locking member 204 to release latch 204d from retaining hole 210a in which latch 204d is retained. This locking mechanism is designed such that as the user pulls lever 203 forward of case 201, i.e., in a direction in which the optical module accommodated in cage 210 is withdrawn from cage 210, latch 204d retained in retaining hole 210a comes off retaining hole 210a. A movable range of lever 203 is limited within a region forward of a front end surface of case 201.

According to the optical module designed as described above, as lever 203 is pulled forward of case 201 to move pivotal shaft 203a of lever 203 to a position at which pivotal shaft 203a comes into abutment to a front end within cutout groove 202, pivotal shaft 203a pushes down cam face 204f formed in front section 204a of locking member 204. This causes locking member 204 to swing about shaft 205 within groove 206 to lift up spring portion 204e and rear section 204c. Then, spring portion 204e comes into abutment to groove 201c formed in a bottom surface of case 201 to bend, causing latch 204d on the bottom surface of rear section 204c to come off retaining hole 210a of cage 210. Consequently, the optical module is released from the locking by the locking mechanism.

While lever 203 is kept pulled forward of case 201, the optical module remains released from the locking by the locking mechanism, so that the optical module can be withdrawn from cage 210 by pulling lever 203 forward of case 201 in this released state maintained.

However, An SFP optical transceiver conforming to the MSA standard, as disclosed in FIG. 1, should have a height of about 10 mm and a width of about 14 mm, i.e., the SFP optical transceiver itself is small in size, so that ejector 170 (see FIG. 1) disposed in such a small optical transceiver must be a miniature component. For this reason, it must be a finger tip (or even a nail tip in some cases) that should depress push plate 179 of ejector 170 illustrated in FIG. 1. However, there is few clearance between the substrate on which the cage is mounted and the bottom surface of the optical transceiver, when the optical transceiver is mounted in the cage, so that the finger tip may not successfully reach the push plate 179 of ejector 170, thus experiencing difficulties in performing operations for unlocking the optical transceiver from the cage.

The locking mechanism for an optical module described in FIG. 2, on the other hand, is made up of two components which are the aforementioned locking member 204 and lever 203, however, such a locking mechanism is preferably made up of the least possible number of components from a view point of the tendency of reducing a material cost and the number of manufacturing steps of the optical module.

In addition, the optical transceiver is typically small in size as mentioned above, and lever 203 is a miniature component. Such a miniature structure forces the user to hold lever 203 with tips of fingers for manipulations. Thus, the user could more readily remove the optical transceiver if the optical transceiver could be unlocked from the cage without the need for manipulating such lever 203.

The optical module illustrated in FIG. 2 limits the movable range of lever 203 within a region forward of the front end surface of case 201 to save the space required to install the optical module in a communication device, thereby making it possible to install a plurality of the optical modules in a communication device at a high density. However, if lever 203 itself can be omitted from the optical module, a larger number of the optical modules can be installed in a communication device at a higher density.

SUMMARY OF THE INVENTION

It is an object of the present invention to provide an optical module which can be readily released from a locking state with a cage, and which can facilitate installation of a plurality of the optical modules in a communication device at a higher density.

According to one aspect of the present invention, an optical module of the present invention comprises a case having a connection port for connection with an external optical fiber cable connector, and a locking member for locking the case in a cage for accommodating the case. The locking member is configured to lock the case in the cage when a connector is connected to the connection port after the case has been inserted into the cage up to a predetermined position, and to unlock the case from the cage when the connector is disconnected from the connection port.

According to this optical module, the case can be locked in the cage through a simple operation of inserting the connector into the connection port after the case has been inserted into the cage. Stated another way, according to the optical module of the present invention, the case is automatically locked in the cage only by inserting the connector into the connection port after the case has been inserted into the cage, so that the optical module can virtually omit the operation otherwise required for locking the case in the cage, thus facilitating the handling of the optical module. Consequently, the user can be prevented from forgetting to lock the case in the cage even if the user is not conscious of locking the case in the cage.

Also, in the optical module of the present invention, the case is unlocked from the cage only by disconnecting the connector from the connection port, resulting in elimination of the operation for unlocking the case, and consequent simplification of the operation for removing the optical module from the cage.

Further, the optical module cannot be withdrawn from the cage with the connector being kept connected to the connection port because the case is maintained to be locked in the cage when the connector is kept connected to the connection port. It is therefore possible to obviate the user from inadvertently withdrawing the optical module from the cage while the optical fiber cable connector is kept connected to the connection port to make a communication, thus preventing communications interrupted in the middle, or a failure in the optical module.

The locking member may include a shaft rotatably supported by the case, a first section positioned on one side of the shaft, and a second section positioned on another side of the shaft, and including a latch for retention by a retaining hole formed in the cage, and a shoulder to which the connector abuts when the connector is connected to the connection port, wherein the locking member may be configured to pivotally move about the shaft to bring the latch into retention by the retaining hole as the second section is pressed by the connector in abutment to the shoulder. In this configuration, as the connector is connected to the connection port, the connector presses the shoulder of the locking member, causing the locking member to pivotally move about the shaft to fit the latch into the retention hole, with the result that the case is locked in the cage.

Further, the locking member may be configured to pivotally move about the shaft as the first section is moved in a direction in which the first section is further away from the case, causing the latch retained in the retaining hole to come off the retaining hole, and the optical module may further include an urging member for urging the first section in the direction in which the first section is moved away from the case. In this configuration, as the connector is disconnected from the connection port, the first section of the locking member is urged by the urging member in the direction in which the first section is moved away from the case, causing the locking member to pivotally move about the shaft to release the latch retained in the retaining hole from the retaining hole, thereby unlocking the case from the cage.

Another optical module according to the present invention includes a case having a connection port for connection with an external optical fiber cable connector, and a locking member for locking the case in a cage for accommodating the case, wherein the locking member has a shaft rotatably supported by the case, a first section positioned on one side of the shaft, and a second section positioned on another side of the shaft, and including a latch for retention by a retaining hole formed in the cage, and a shoulder to which the connector abuts when the connector is connected to the connection port. The locking member is configured to pivotally move about the shaft to a position at which the latch is fitted into the retaining hole as the second section is pressed by the connector in abutment to the shoulder. The locking member is further configured to pivotally move about the shaft to a position at which the latch retained in the retaining hole comes off the retaining hole as the first section is moved in a direction in which the first section is further away from the case. The optical module further includes an urging member for urging the first section in the direction in which the first section is moved away from the case.

According to the other optical module of the present invention, as the connector is connected to the connection port, the connector presses the shoulder of the locking member, causing the locking member to pivotally move about the shaft to fit the latch into the retaining hole, thereby locking the case in the cage. On the other hand, as the connector is disconnected from the connection port, the first section of the locking member is urged by the urging member in the direction in which the first section is moved away from the cage, causing the locking member to pivotally move about the shaft to release the latch retained in the retaining hole from the retaining hole, thereby unlocking the case from the cage.

In this way, according to the other optical module of the present invention, the case can also be locked in the cage through a simple operation of inserting the connector into the connection port after the case has been inserted into the cage. Stated another way, according to the other optical module of the present invention, the case is automatically locked in the cage only by inserting the connector into the connection port after the case has been inserted into the cage, so that the optical module can virtually omit the operation otherwise required for locking the case in the cage, thus facilitating the handling of the optical module. Consequently, the user can be prevented from forgetting to lock the case in the cage even if the user is not conscious of locking the case in the cage.

Also, the optical module cannot be withdrawn from the cage with the connector being kept connected to the connection port because the case is maintained to be locked by the cage when the connector is kept connected to the connection port. It is therefore possible to obviate the user from inadvertently withdrawing the optical module from the cage while the optical fiber cable connector is kept connected to the connection port to make a communication, thus preventing communications interrupted in the middle, or a failure in the optical module.

Further, the other optical module of the present invention is similar in that the case is unlocked from the cage only by disconnecting the connector from the connection port, resulting in elimination of the operation for unlocking the case, and consequent simplification of the operation for removing the optical module from the cage.

The locking member may be configured to act within a recessed groove space formed in the case.

If the locking member acts beyond the outer dimensions of the case, a plurality of optical modules, when installed in a single device, must be arranged at wider intervals in consideration of the movable range of the locking member, so that the optical modules cannot be installed in the device at a high density. On the other hand, when the locking member is configured to act only within the recessed groove space formed in the case, as proposed by the present invention, the movable range of the locking member need not be taken into consideration when the optical modules are installed in a device, thus making it possible to arrange the optical modules at narrower intervals and consequently install a plurality of optical modules in the device at a higher density.

The urging member may include a spring member.

Additionally, the locking member may be integrally formed with the spring member.

Further, the spring member and locking member may be made of a resin material.

Alternatively, the locking member may be made of a metal material.

The urging member may be made up of a pair of magnets disposed in the case and the first section, respectively, such that the same poles oppose each other.

An optical module/cage assembly according to the present invention includes the optical module described above, a cage having the optical module inserted therein up to a predetermined position, and a dust cap having the same shape as the connector, and connected to the connection port formed in the optical module.

According to the assembly of the present invention, the optical module can be locked in the cage with the connection port being closed by inserting the optical module into the cage up to the predetermined position, and inserting the dust cap into the connection port. With the dust cap thus inserted into the connection port, it is possible to prevent the optical module from coming off the cage to be damaged during transportation, and fine dust possibly produced from a packing material from sticking to an optical unit within the optical module during transportation to inhibit the optical module from normally operating.

A method of locking an optical module in a cage for accommodating the optical module according to the present invention involves locking the optical module in the cage, wherein the optical module includes a case having a connection port for connection with an external optical fiber cable connector, and a locking member for locking the case in the cage, and the locking member includes a shaft rotatably supported by the case, a first section positioned on one side of the shaft, and a second section positioned on another side of the shaft, and including a latch for retention in a retaining hole formed in the cage, and a shoulder to which the connector abuts when the connector is connected to the connection port. The method includes the steps of inserting the case into the cage up to a predetermined position, connecting the connector to the connection port, pressing the second section with the connector in abutment to the shoulder to pivotally move the locking member about the shaft, and fitting the latch into the retaining hole.

According to the method of the present invention described above, the case can be automatically locked in the cage only through a simple operation of inserting the connector into the connection port after the case has been inserted into the cage.

A method of unlocking an optical module from a cage for accommodating the optical module according to the present invention involves unlocking from the cage the optical module including a case having a connection port for connection with an external optical fiber cable connector, and a locking member for locking the case in the cage, wherein the locking member includes a shaft rotatably supported by the case, a first section positioned on one side of the shaft, and a second section positioned on another side of the shaft and including a latch for retention by a retaining hole formed in the cage, and a shoulder to which the connector abuts when the connector is connected to the connection port. The method includes the steps of disconnecting the connector connected to the connection port from the connection port, moving the first section in a direction in which the first section is further away from the case to pivotally move the locking member about the shaft, and releasing the latch retained in the retaining hole from the retaining hole.

According to the method of the present invention described above, as the connector is disconnected from the connection port, the locking member pivotally moves about the shaft to automatically unlock the case from the cage.

The above and other objects, features and advantages of the present invention will become apparent from the following description with reference to the accompanying drawings which illustrate examples of the present invention.

DESCRIPTION OF THE PREFERRED EMBODIMENTS

Figure 1:
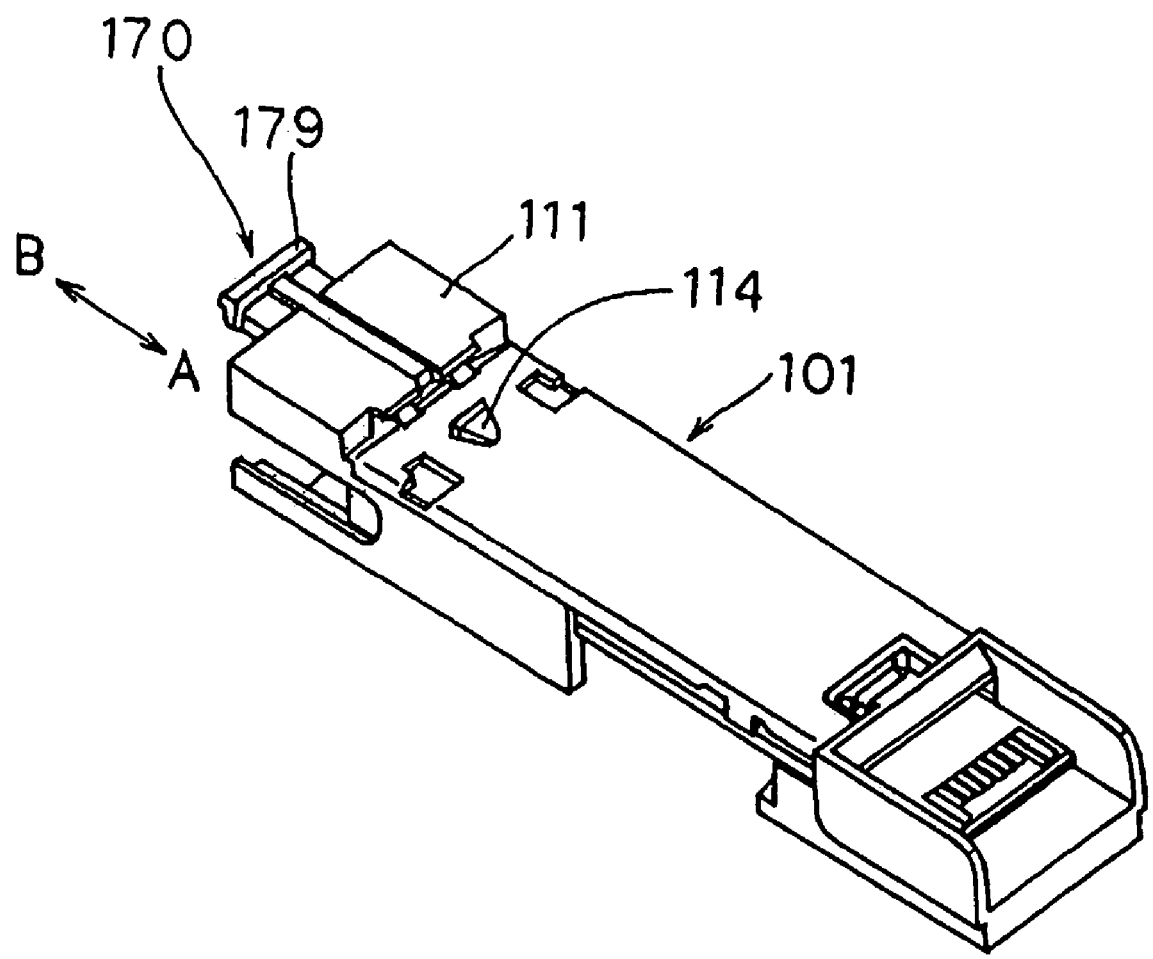
FIG. 1 is a perspective view illustrating a conventional optical transceiver with its bottom surface oriented upward.
Figure 2:
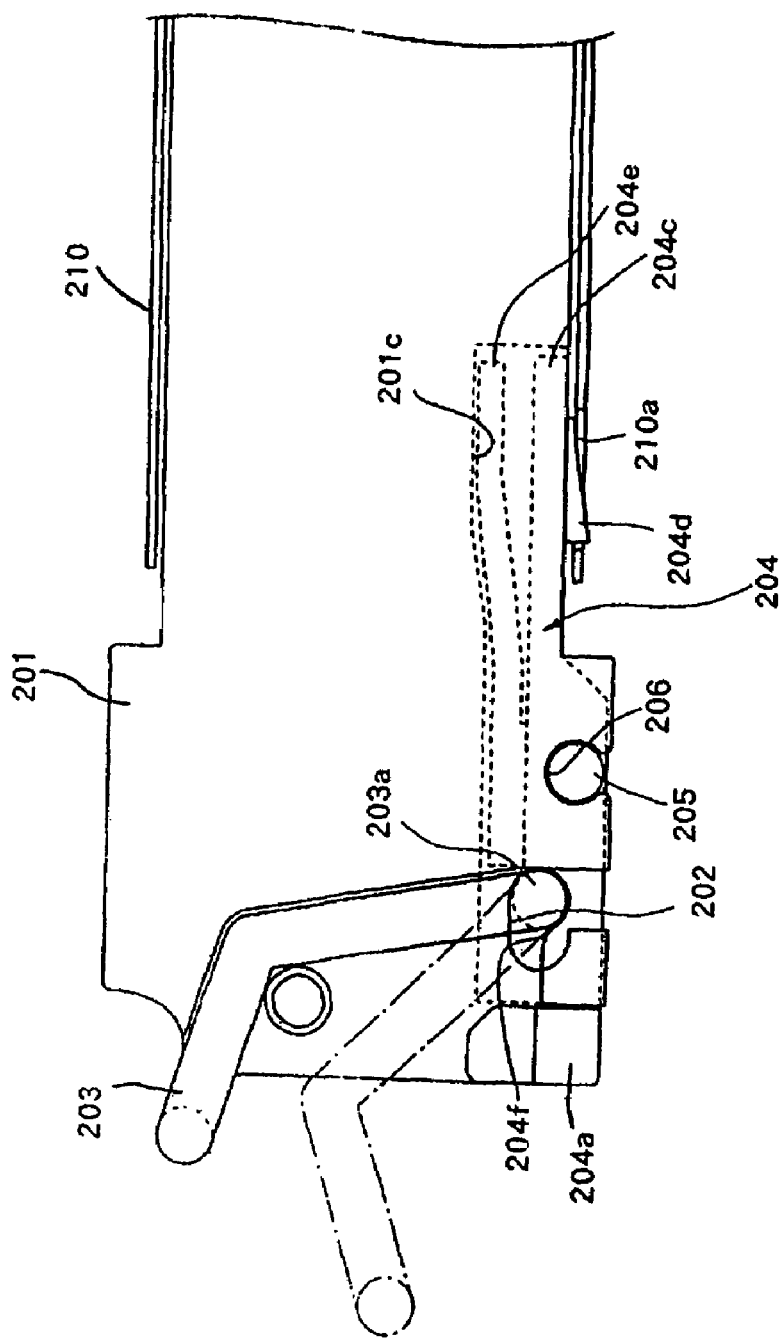
FIG. 2 is a diagram illustrating an optical module described in a prior application filed by the present applicant.
Figure 3A:
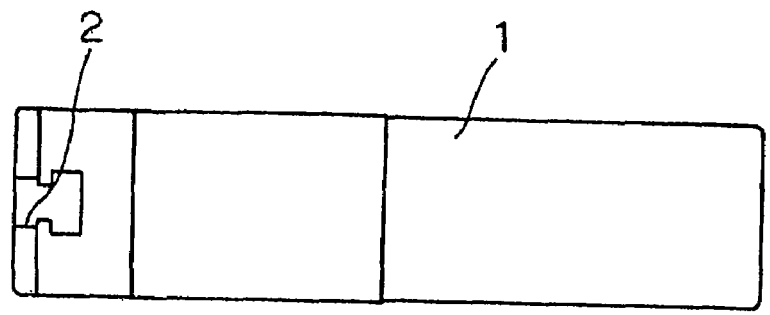
FIGS. 3A-3D are diagrams illustrating one embodiment of an optical module according to the present invention.
Figures 3B, 3D:
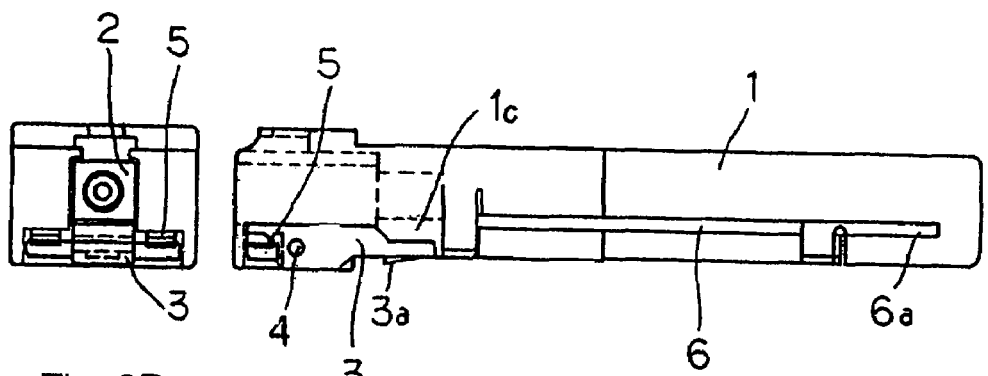
Figure 3C:
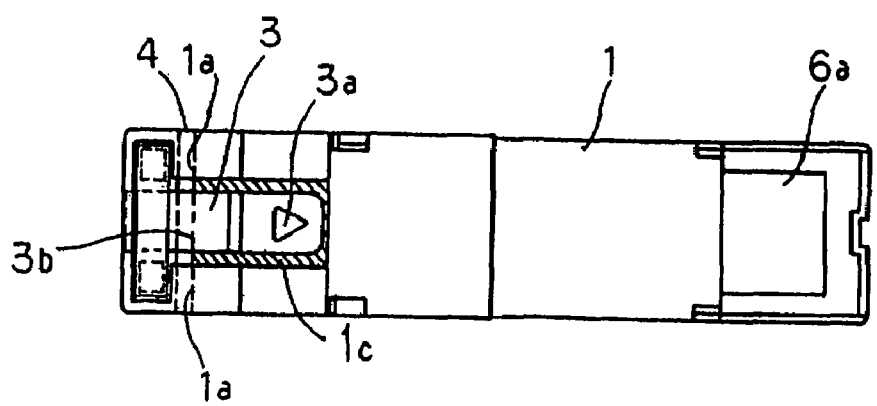
Figure 4B:
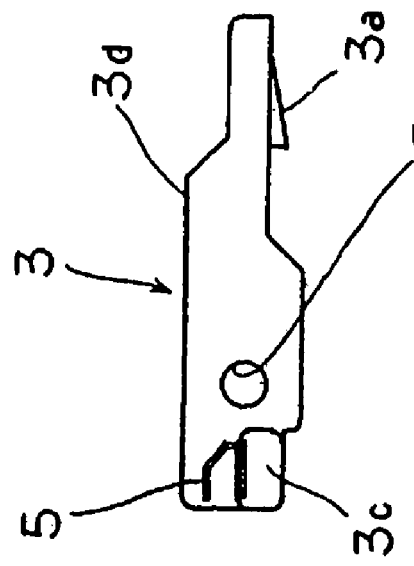
FIGS. 4A-4C are diagrams illustrating a locking member of the optical module illustrated in FIGS. 3A-3D.
Figure 4C:
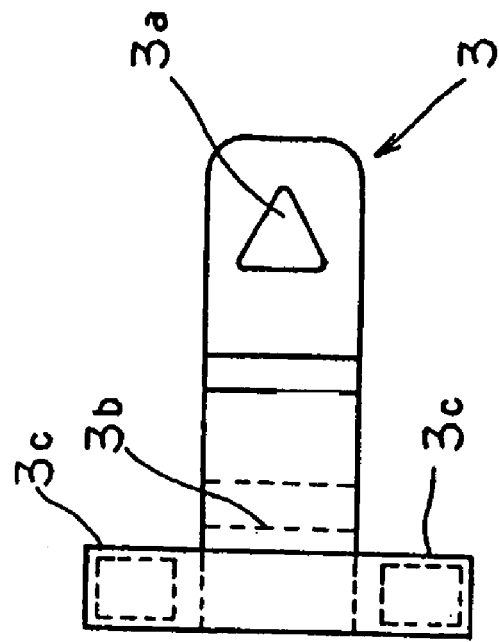
Figure 4A:
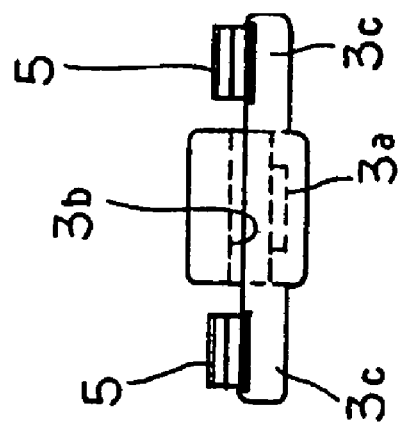

FIGS. 3A-3D are diagrams illustrating one embodiment of an optical module according to the present invention, where FIG. 3A is a top plan view of the optical module, FIG. 3B is a front view of the same, FIG. 3C is a bottom view of the same, and FIG. 3D is a left side view of the same. FIG. 3B also illustrates the internal structure of the optical module for convenience of description. FIGS. 4A-4C are diagrams illustrating a locking member shown in FIGS. 3A-3D, where FIG. 4A is a left side view of the locking member, FIG. 4B is a front view of the same, and FIG. 4C is a bottom view of the same.

As illustrated in FIGS. 3A-3C, the optical module of this embodiment comprises case 1 which defines the shape of the optical module; and locking member 3 attached to the bottom of case 1 near a front end surface. Case 1 contains printed circuit board 6 mounted with an optical unit (not shown) which includes a light emitting element and a light receiving element such as a laser diode (LD) and a photodiode (PD). Printed circuit board 6 has connection terminals 6a disposed on the right side (see FIG. 3B), as illustrated, on a rear edge thereof for connection with socket 21 (see FIG. 8) within cage 10 (see FIG. 7), later described, when case 1 is accommodated in cage 10.

Figure 7:
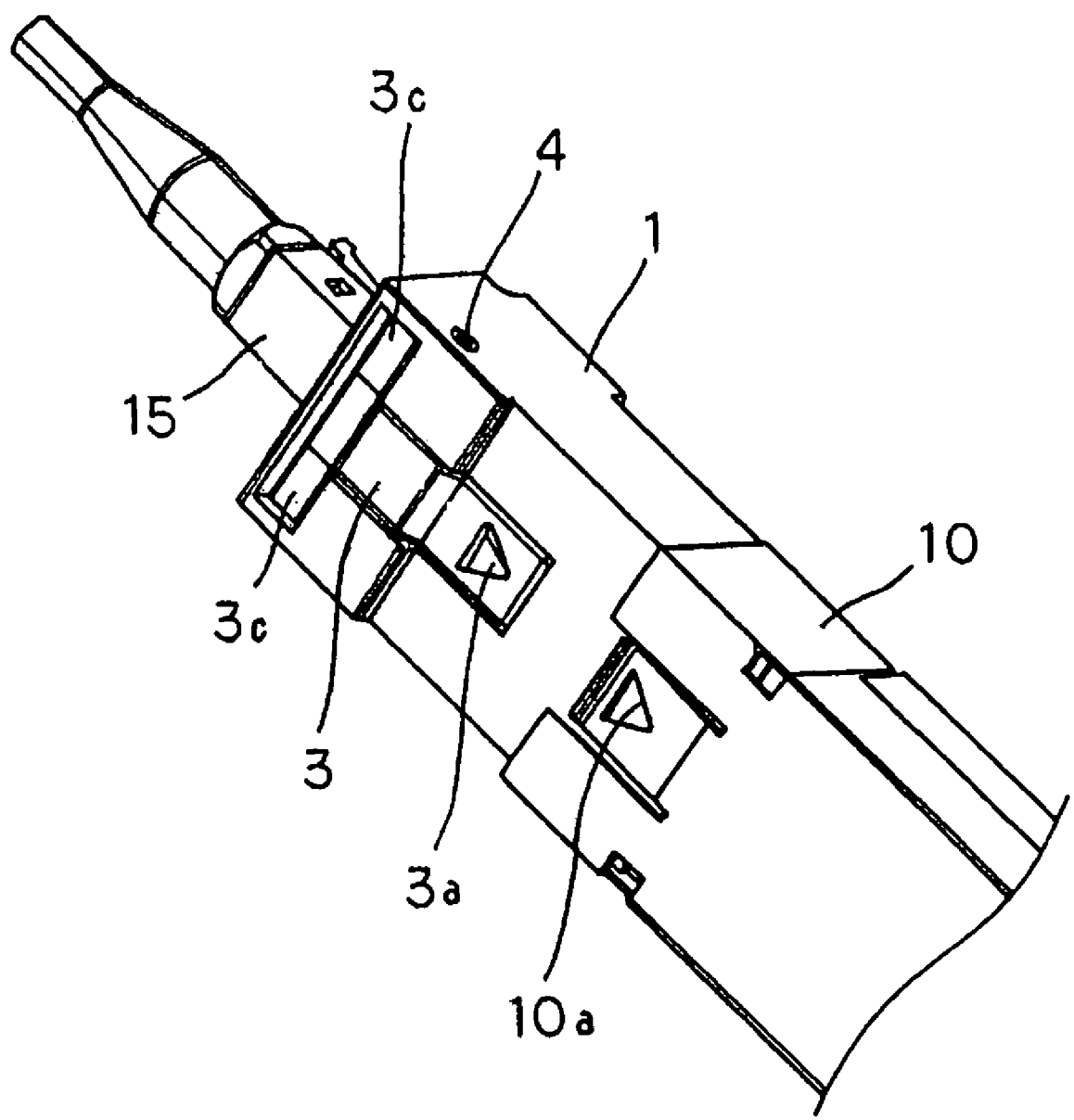
FIG. 7 is a perspective view, taken from below, of the optical module illustrated in FIGS. 3A-3D when it is inserted in a cage.

Case 1 also has connection port 2 which is open on the front end surface thereof for connection with optical fiber cable connector 15 (see FIG. 7). By inserting optical fiber cable connector 15 into connection port 1, optical fiber cable connector 15 can be connected to the optical module.

The optical module according to this embodiment can be provided for any of transmission, reception, and transmission/reception of optical signals, and has at least one of a light emitting element and a light receiving element as mentioned above. Connection port 2 formed on the front end surface of case 1 is not limited in number.

Recessed groove space 1c is formed in a lower front portion of case 1 for receiving locking member 3. Shaft fixing holes 1a are formed on both sides of recessed groove space 1c of case 1 for fixing shaft 4 which pivotably supports locking member 3 on case 1. Locking member 3 is attached to case 1 by placing locking member 3 in recessed groove space 1c of case 1, inserting shaft 4 through shaft fixing holes 1a of case 1 and shaft receiving hole 3b of locking member 3, and fixing both ends of shaft 4 at respective shaft fixing holes 1a with an adhesive or the like. In this event, shaft 4 should not be fixed to shaft receiving hole 3b of locking member 3. This allows locking member 3 to pivotally move about shaft 4.

Referring now to FIGS. 4A-4C, locking member 3 will be described in regard to the structure. Locking member 3 comprises latch 3a which is retained in retaining hole 10a (see FIG. 7) of cage 10 when case 1 is accommodated in cage 10; shaft receiving hole 3b for shaft 4 inserted therethrough; spring seats 3c each having a top surface for fixing spring 5 thereon; and shoulder 3d to which connector 15 comes into abutment when connector 15 (see FIG. 7) is connected to connection port 2. In this specification, a portion of locking member 3 in front of shaft receiving holes 3b (left-hand side in FIG. 4B) is referred to as the "first section," while a portion of locking member behind shaft receiving holes 3b (right-hand side in FIG. 4B) is referred to as the "second section." In other words, spring seats 3c are disposed in the first section of locking member 3, while latch 3a and shoulder 3d are disposed in the second section of the same.

Spring seats 3c are disposed on both sides of the body of locking member 3. Spring 5 is fixed on the top surface of each spring seat 3c as an urging member for urging the first section of locking member 3 in a direction in which the first section is moved away from case 1. While a plate spring is illustrated in FIGS. 4A and 4B as an implementation of spring 5, another spring member may be used for spring 5, including a coil spring and the like.

Locking member 3 and spring 5 may be integrally molded, for example, by a molding process. A suitable material for these components may be a resin such as PPS (polyphenylene sulfide). Alternatively, locking member 3 may have been molded using a resin as mentioned above, such that spring 5 is subsequently attached onto each spring seat 3c of the molding. In the latter case, spring 5 can be made of a material different from that of locking member 3. For example, only spring 5 can be made of a metal.

Further alternatively, locking member 3 may be formed by a die cast technique or the like. A suitable material in this technique may be a metal such as zinc, aluminum, or the like. Preferably, in this case, locking member 3 may have been previously formed of a metal material as mentioned above, and spring 5 is subsequently attached onto each spring seat 3c of the molding.

Figure 5A:
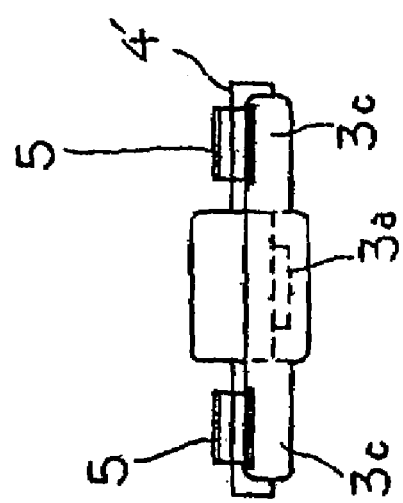
FIGS. 5A-5C are diagrams illustrating an exemplary modification to the locking member and a shaft.
Figure 5B:
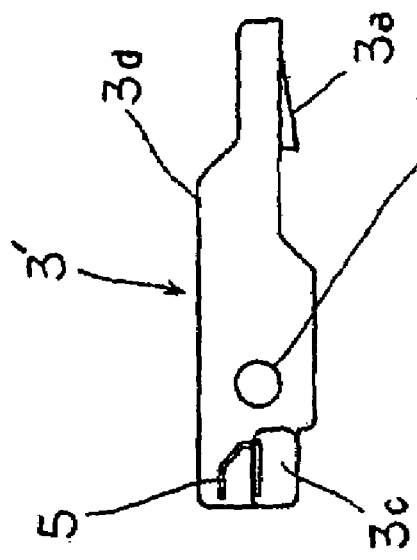
Figure 5C:
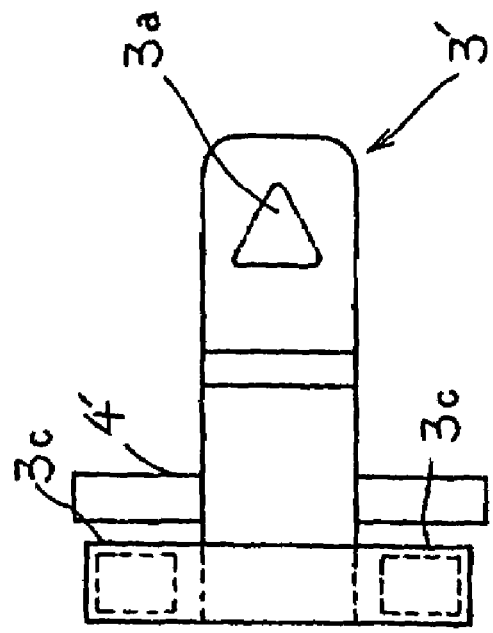

In the foregoing structure given as an example for purposes of description, locking member 3 and shaft 4 are made as separate components, and after locking member 3 is placed in recessed groove space 1c of case 1, shaft 4 is inserted through shaft fixing holes 1a of case 1 and shaft receiving hole 3b of locking member 3, and both ends of shaft 4 are fixed to respective shaft fixing holes 1a with an adhesive or the like to attach locking member 3 to case 1. The optical module of the present invention, however, is not limited to locking member 3 and shaft 4 in this particular structure or to the structure for supporting locking member 3, provided by case 1. For example, as illustrated in FIGS. 5A-5C, locking member 3' may be integrally formed with shaft 4', and case 1 may be provided with a support which permits shaft 4' to be snap fitted thereon from the outside. In this alternative structure, the number of parts associated with these components can be further reduced, as compared with the foregoing structure which has locking member 3 and shaft 4 as separate components.

Figure 6:
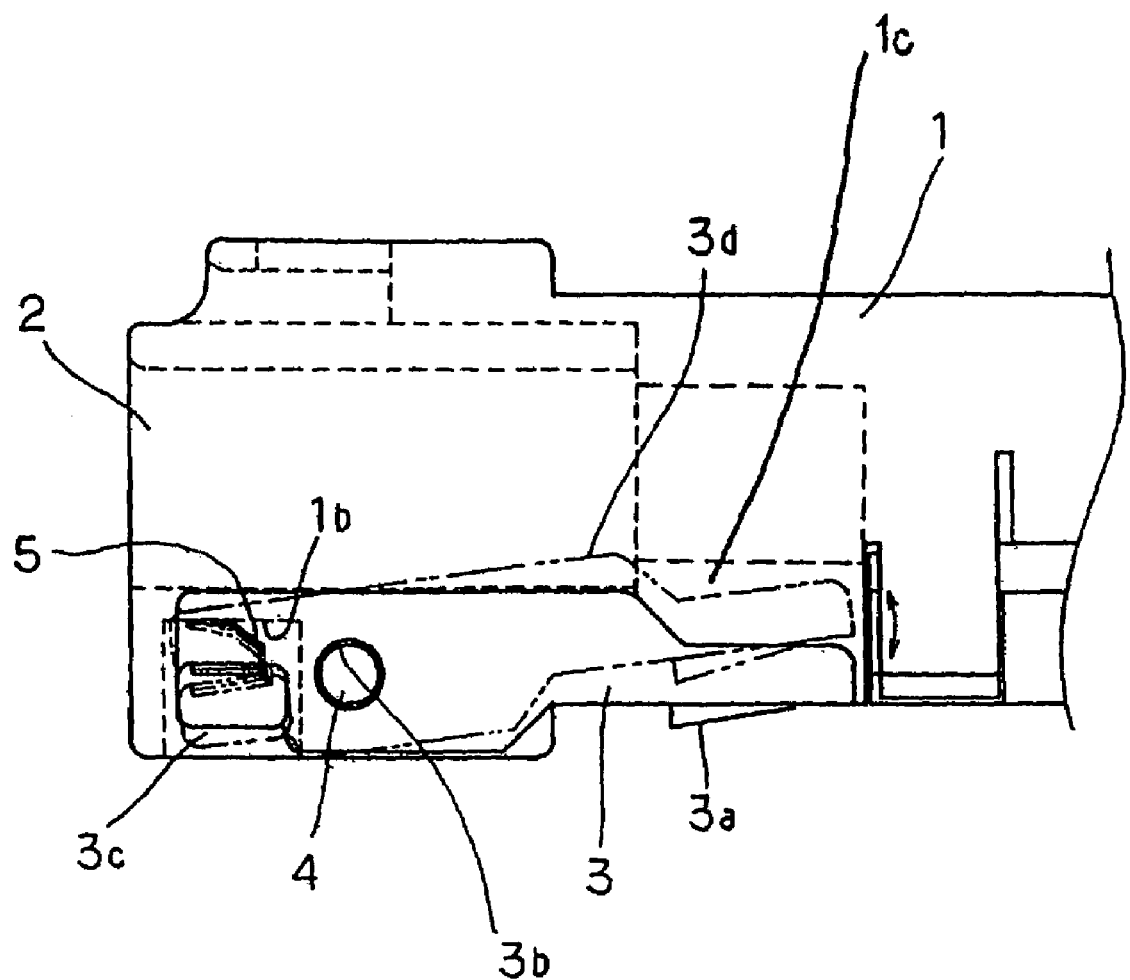
FIG. 6 is a partially enlarged view representing the operation of the locking member in the optical module illustrated in FIGS. 3A-3D.

FIG. 6 is a partially enlarged view representing the operation of the locking member in the optical module illustrated in FIGS. 3A-3C.

As described above, shaft receiving hole 3b of locking member 3 is supported by shaft 4, so that locking member 3 is capable of pivotal movements about shaft 4. In FIG. 6, locking member 3 drawn by one-dot chain lines represents its posture when connector 15 (see FIG. 7) is not connected to connection port 2, while locking member 3 drawn by solid lines represents its posture when connector 15 is kept connected to connection port 2.

When connector 15 is not connected to connection port 2, each of springs 5 stretches between associated spring receiving surface 1b formed on the bottom surface of case 1 and spring seat 3c to push down the first section including spring seats 3c. This causes locking member 3 to rotate about shaft 4 in the counter-clockwise direction in the figure to lift up the second section of locking member 3 including latch 3a and shoulder 3d into recessed groove space 1c of case 1, thereby bringing locking member 3 into the posture represented by the one-dot chain lines in FIG. 6.

On the other hand, as connector 15 is connected to connection port 2, the bottom surface of connector 15 comes into abutment to shoulder 3d of locking member 3 to push down the second section of locking member 3, thereby bringing locking member 3 into the posture represented by the solid lines in FIG. 6. In this event, the first section of locking member 3 including spring seats 3c rotates about the shaft 4 in the clockwise direction in the figure to narrow down the spacings between respective spring seats 3c and spring receiving surfaces 1b, causing springs 5 to contract.

Each of springs 5 used in this embodiment generates an urging force just enough to maintain locking member 3 in the posture represented by the one-dot chain lines when connector 15 is not connected to connection port 2, and therefore generates a slight amount of force by its compression. As such, the user can connect connector 15 to connection port 2 without substantially feeling repellent forces of springs 5.

Locking member 3 in this embodiment is designed to act within recessed groove space 1c of case 1.

If locking member 3 acts beyond the outer dimensions of case 1, a plurality of optical modules, when installed in a single device, must be arranged at wider intervals in consideration of the movable range of each locking member 3, so that the optical modules cannot be installed in the device at a high density. On the other hand, when the action of locking member 3 is limited within recessed groove space 1c of case 1 as in this embodiment, the movable range of locking member 3 need not be taken into consideration when the optical modules are installed in a device, thus making it possible to arrange the optical modules at narrower intervals and consequently install a plurality of the optical modules in the device at a higher density.

While spring 5 has been exemplified by a plate spring in the foregoing description, another spring member can be used for spring 5 instead of the plate spring, including a coil spring and the like. Alternatively, springs 5 may be replaced with a pair of magnets disposed in spring seats 3c and spring receiving surfaces 1b such that the same poles face each other, respectively, thereby providing an urging member between spring seats 3c and spring receiving surfaces 1b.

Figure 8:
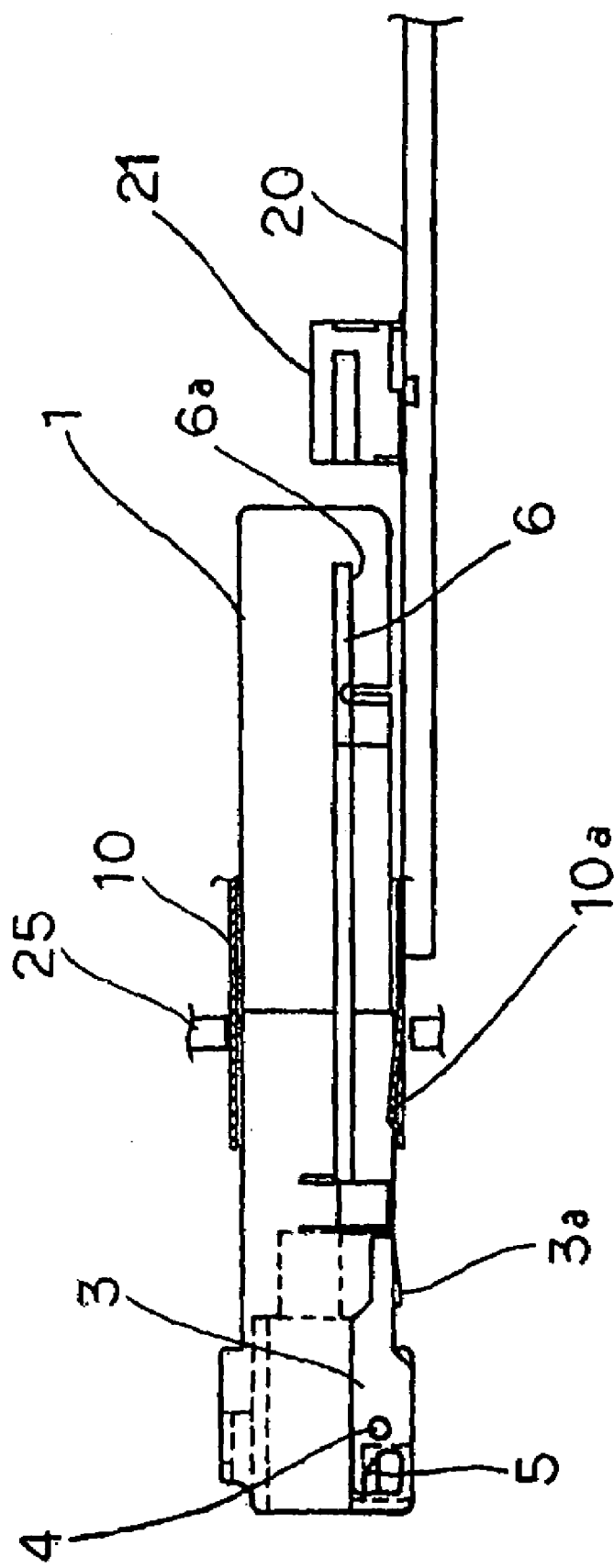
FIG. 8 is a front view of the optical module illustrated in FIGS. 3A-3D when it is inserted in the cage.

FIG. 7 is a perspective view, taken from below, of the case of the optical module illustrated in FIGS. 3A-3C when it is inserted in the cage. FIG. 8 in turn is a front view of the case of the optical module illustrated in FIGS. 3A-3C when it is inserted in the cage. FIG. 8 also shows the internal structure of the optical module for convenience of description.

Cage 10 for accommodating case 1 of the optical module has retaining hole 10a on its bottom surface. Retaining hole 10a is arranged at a position at which latch 3a of locking member 3 is retained thereby when case 1 is inserted into cage 10.

Cage 10, which is placed on mother board 20 within a communication device or the like, has part thereof projecting from an opening formed through front panel 25 of the communication device or the like. Socket 21 mounted on mother board 20 is disposed at the rear end within cage 10. Connected to socket 21 are connection terminals 6a of printed circuit board 6 within case 1, when case 1 is accommodated in cage 10.

Cage 10 may be made by bending a plate made of a metal, for example, stainless steel (SUS) or the like. Likewise, case 1 may also be made by bending a plate made of a metal such as stainless steel (SUS). Alternatively, case 1 may be fabricated by molding using a resin such as PPS (polyphenylene sulphide) in a manner similar to locking member 4.

Next, a sequence of operations from insertion of the foregoing optical module into cage 10 and to withdrawal of the optical module from cage 10 will be described with reference to FIGS. 9 to 12.

Figure 9:
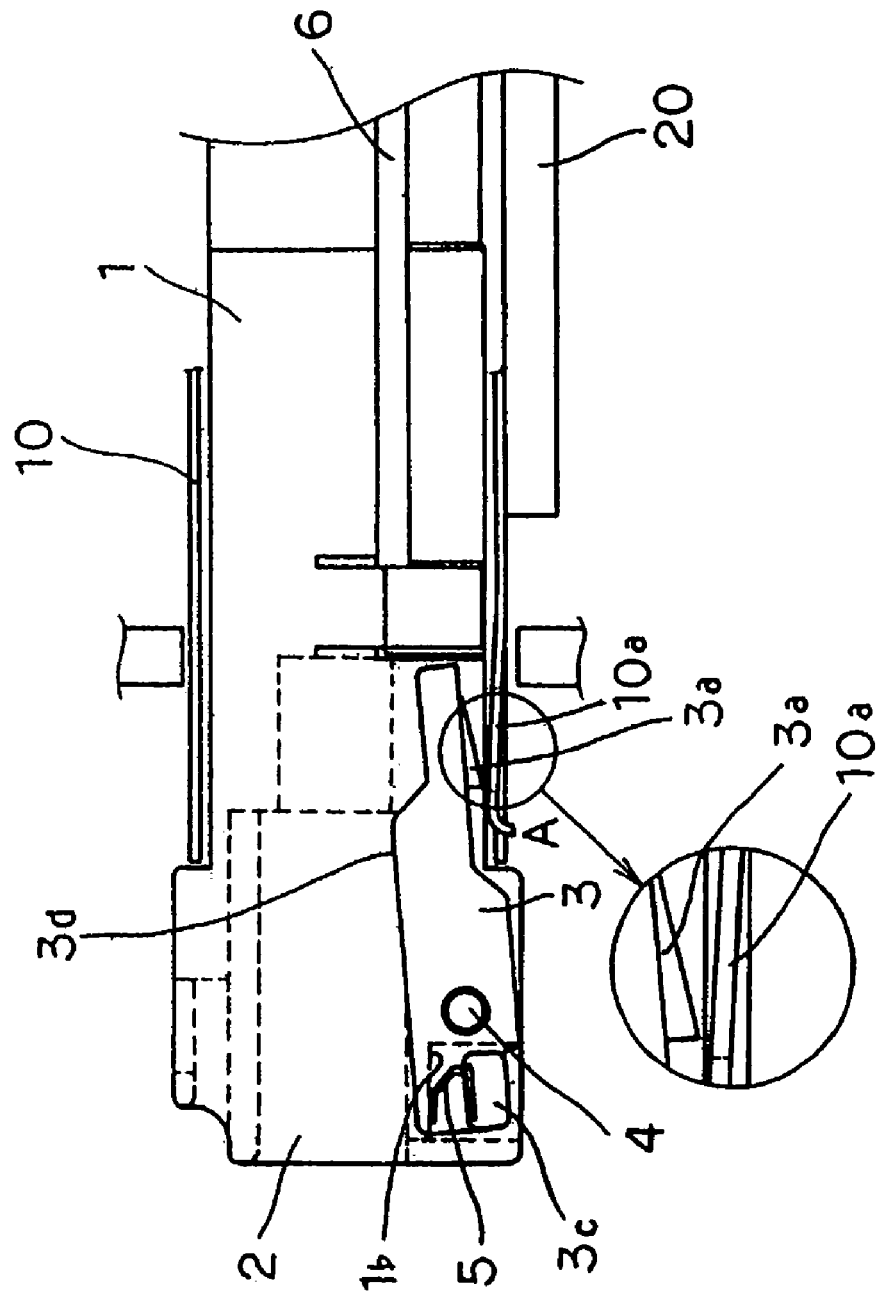
FIG. 9 is a diagram illustrating the optical module inserted in the cage.

FIG. 9 illustrates the optical module which is accommodated in cage 10. In this event, connection terminals 6a (see FIG. 8) of printed board 6 within case 1 are kept connected to socket 21 (see FIG. 8) on mother board 20. In the state illustrated in FIG. 9, however, connector 15 has not been inserted into connection port 2, with locking member 3 having latch 3a not retained by retaining hole 10a of cage 10, so that case 1 is not locked in cage 10.

Figure 10:
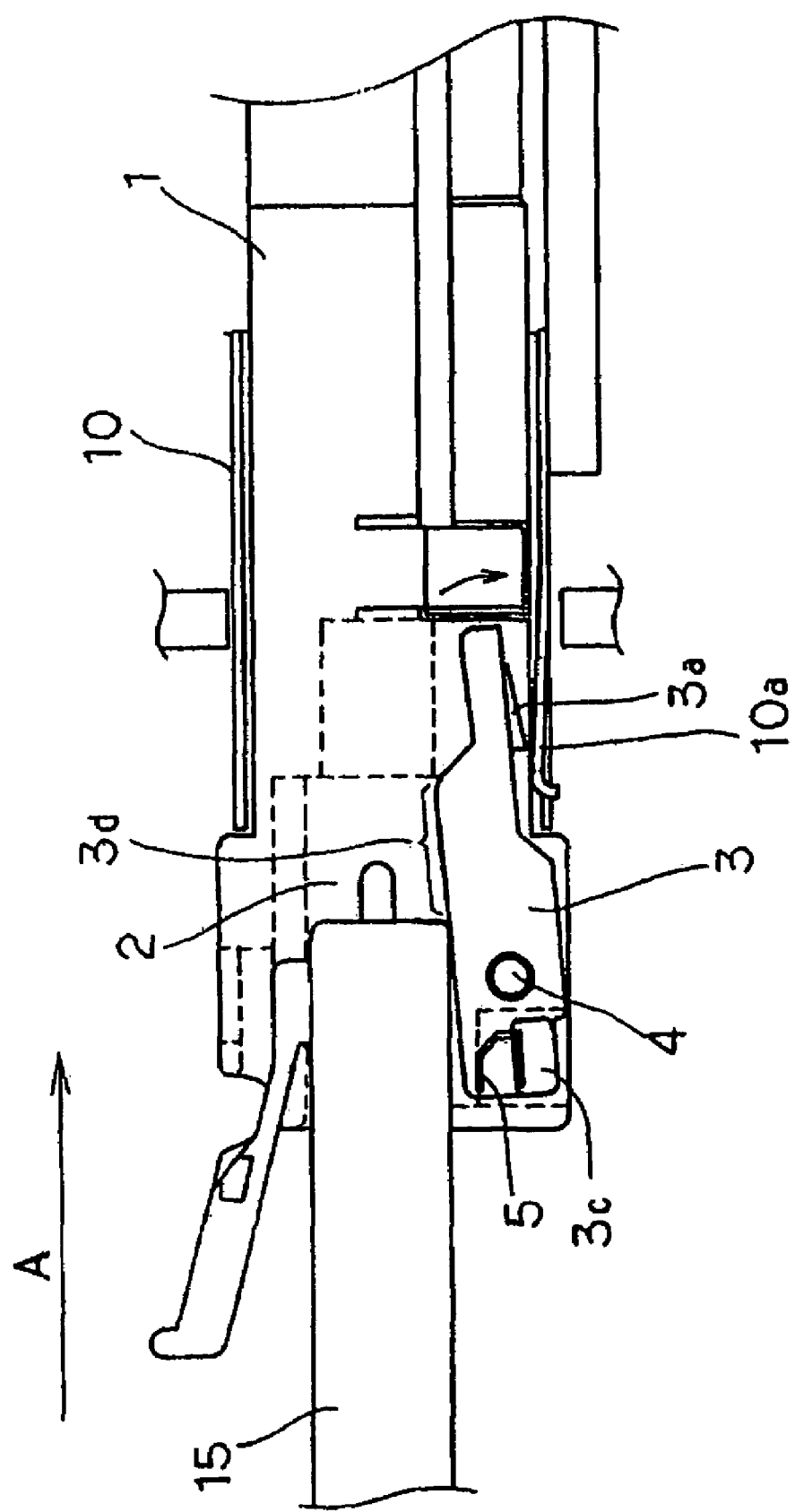
FIG. 10 is a diagram illustrating a connector inserted halfway into a connection port of the case shown in FIG. 9.

As connector 15 is inserted halfway into connection port 2 of case 1, the resulting state is shown in FIG. 10. In this event, the bottom surface of a leading end portion of connector 15 is coming into abutment to shoulder 3d on the top surface of locking member 3. As connector 15 is further inserted deep into connection port 2 from the state shown in FIG. 10, shoulder 3d of locking member 3 is gradually pushed down by the leading end of connector 15, causing locking member 3 to rotate about shaft 4 in the clockwise direction.

Figure 11:
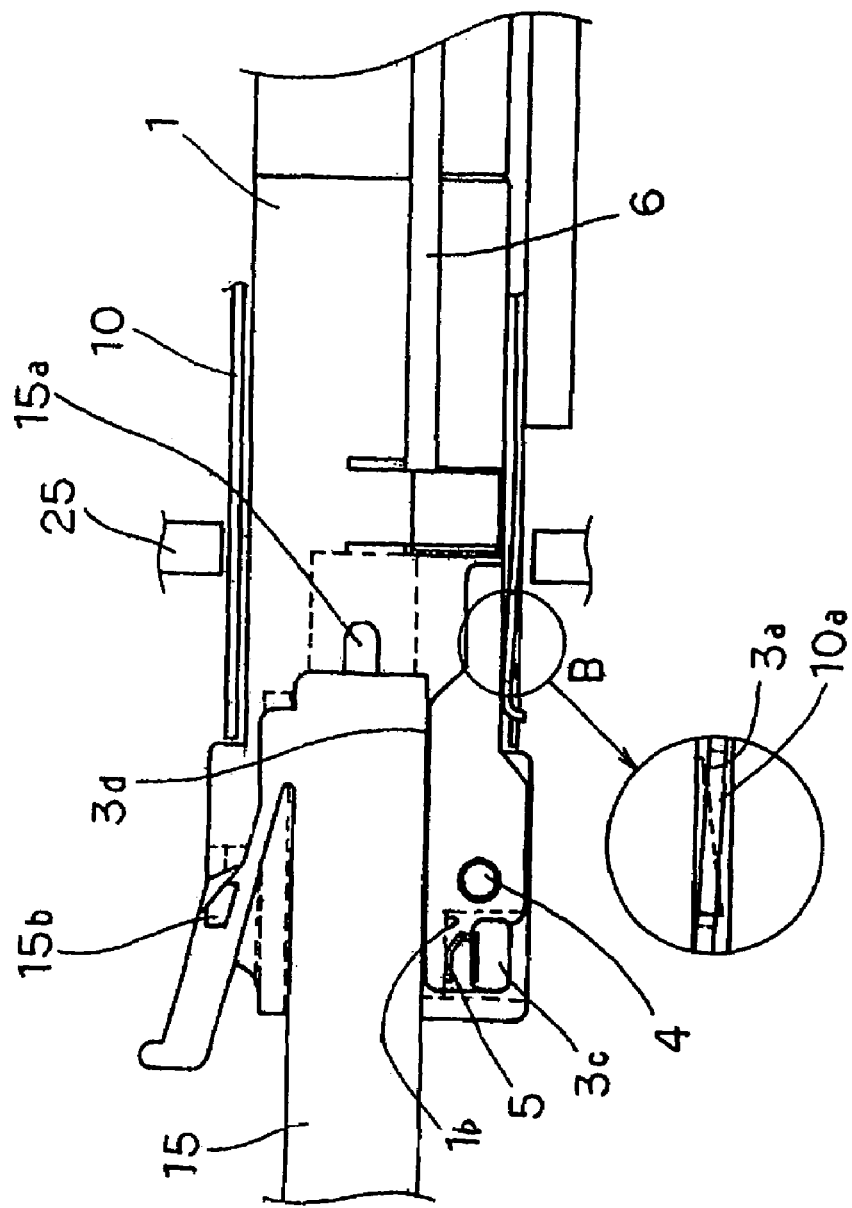
FIG. 11 is a diagram illustrating the connector fully inserted into the connection port of the case.

FIG. 11 illustrates connector 15 fully inserted into connection port 2 of case 1. As connector 15 is inserted into connection port 2 up to a position indicated in FIG. 11, shoulder 3d of locking member 3 is completely pushed down by the bottom surface of connector 15. In this event, latch 3a of locking member 3 is fitted into retaining hole 10a of cage 10, thereby locking case 1 by cage 10. Also, as connector 15 is fully inserted into connection port 2 of case 1, latch 15b of connector 15 is retained by a retaining hole in connection port 2, causing optical fiber end 15a projecting from the leading end of connector 15 to be connected to an optical unit (not shown) on printed board 6.

As appreciated, when connector 15 is kept connected to connection port 2, case 1 is locked in cage 10, so that the optical module cannot be removed from cage 10 with connector 15 kept connected to connection port 2. It is therefore possible to obviate the user from inadvertently withdrawing the optical module from cage 10 while optical fiber cable connector 15 is kept connected to connection port 2 to make a communication, thus preventing communications interrupted in the middle, or a failure in the optical module.

Figure 12:
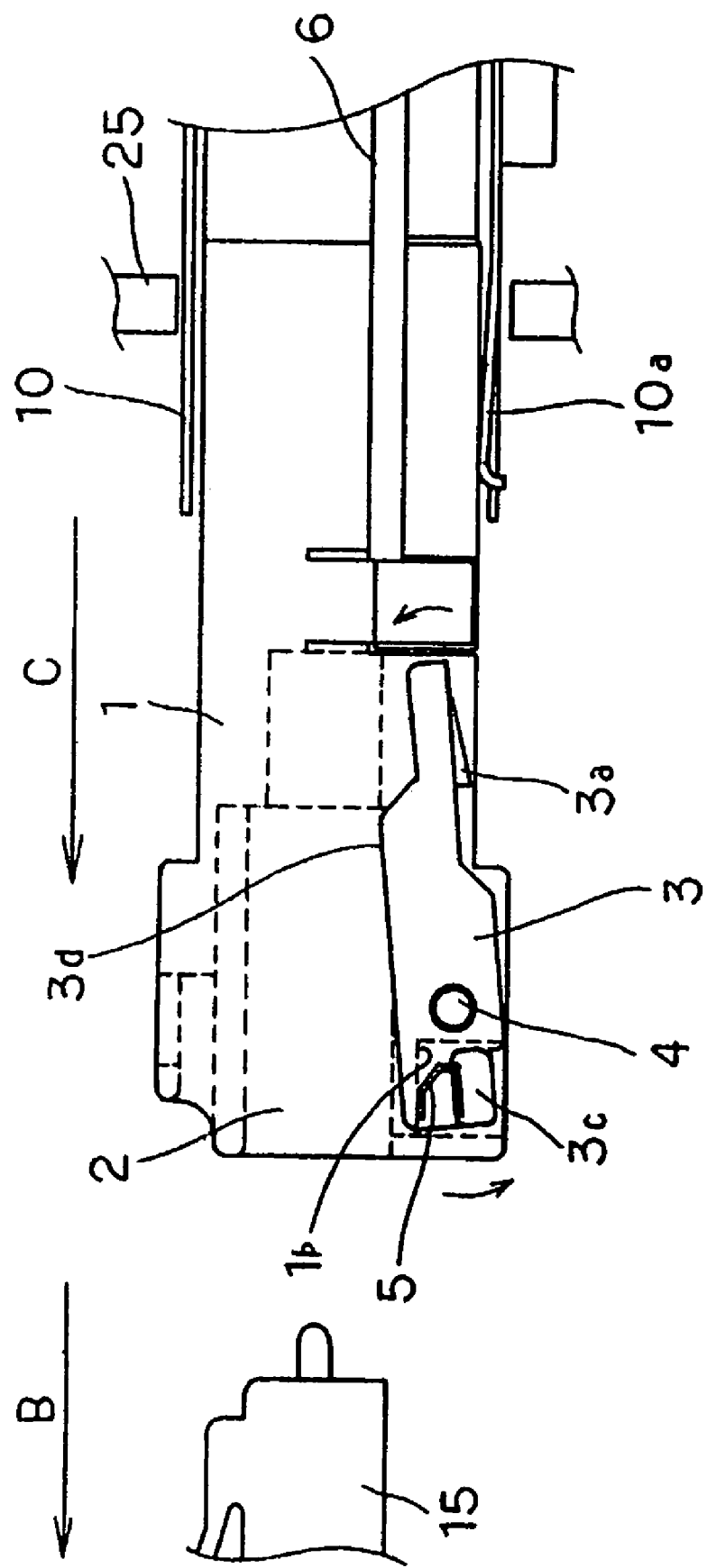
FIG. 12 is a diagram representing operations for withdrawing the optical module from the cage.

FIG. 12 is a diagram illustrating operations involved in withdrawing optical module from cage 10. For withdrawing the optical module from cage 10, connector 15 is first removed from connection port 2 of case 1 in a direction indicated by an arrow B. In response, springs 5, which have been compressed between associated spring receiving surfaces 1*b* of case 1 and spring seats 3*c* of locking member 3, stretch, causing locking member 3 to rotate about shaft 4 in the counter-clockwise direction. The rotation causes latch 3*a* to lift up and come off retaining hole 10*a*, thereby releasing latch 3*a* from the retention by retaining hole 10*a*. Then, as case 1 is withdrawn in a direction indicated by arrow C after latch 3*a* has been released from the retention by retaining hole 10*a* in this manner, the optical module can be removed from cage 10.

As described above, in the optical module of this embodiment, latch 3*a* can be retained in retaining hole 10*a* of cage 10 to lock case 1 in cage 10 through simple operations of inserting case 1 into cage 10 and then inserting connector 15 into connection port 2. In other words, according to the optical module of this embodiment, case 1 is automatically locked in cage 10 only by inserting connector 15 into connection port 2 after case 1 has been inserted into cage 10, so that the optical module can virtually omit the operation otherwise required for locking case 1 in cage 10, thus facilitating the handling of the optical module. Consequently, the user can be prevented from forgetting to lock case 1 in cage 10 even if the user is not conscious of locking case 1 in cage 10.

For removing the optical module from cage 10, on the other hand, latch 3*a* is released from the retention by retaining hole 10*a* only by disconnecting connector 15 from connection port 2, resulting in elimination of the operation for releasing the retention and in consequent simplification of the operation for removing the optical module from cage 10.

Also, in the optical module of this embodiment, locking member 3 acts within recessed groove space 1*c* of case 1, so that even if a plurality of optical modules are arranged vertically and horizontally adjacent to one another, locking member 3 of certain optical module will not interfere with other optical modules. It is therefore possible to install a plurality of optical modules in a communication device or the like at a higher density.

Figure 13:
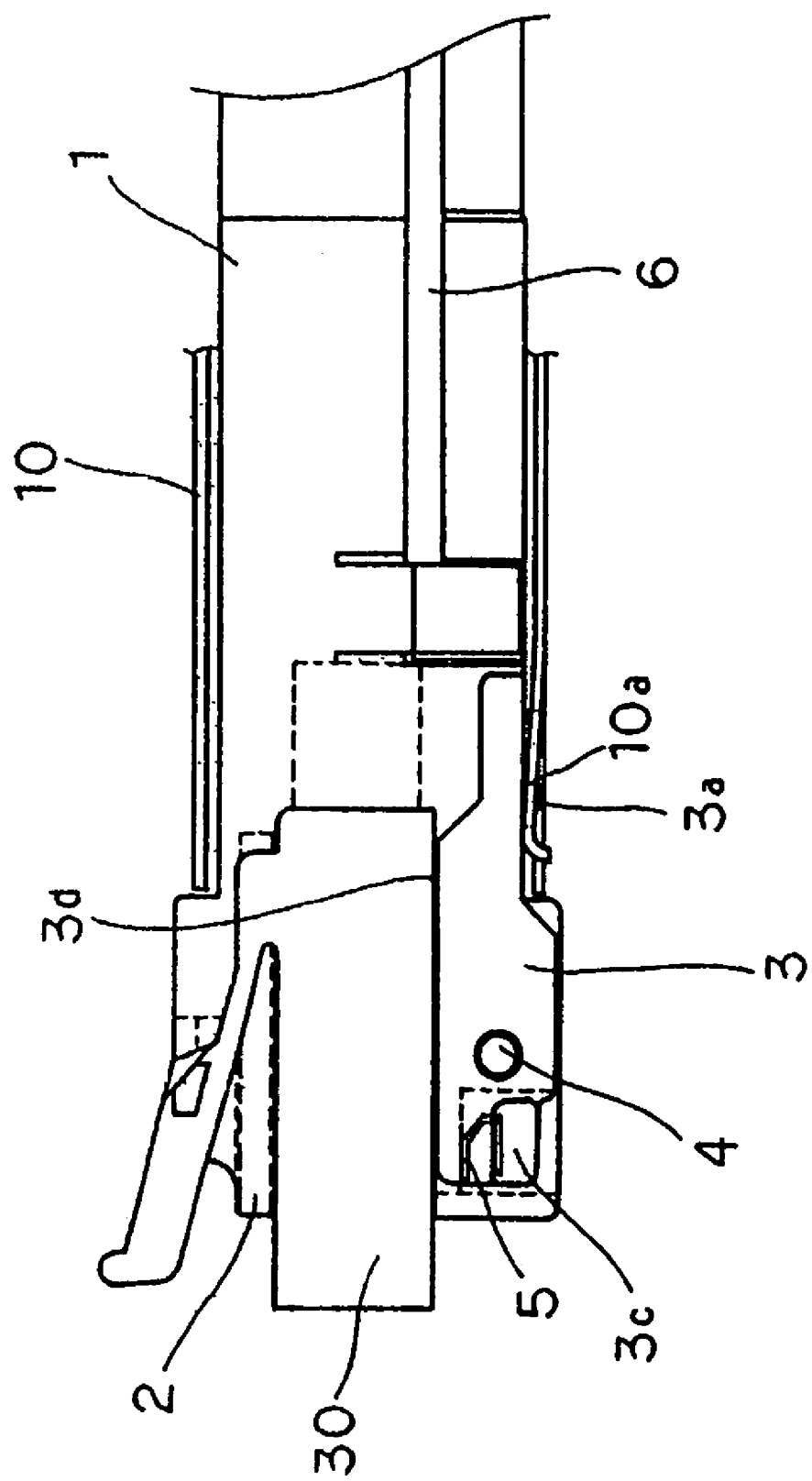
FIG. 13 is a diagram illustrating the optical module according to the embodiment when it is distributed.

Next, description will be made on the optical module according to this embodiment during distribution. FIG. 13 is a diagram illustrating the optical module according to this embodiment when it is in distribution.

Generally, the optical module is accommodated in cage 10 when it is shipped for sale. For this reason, the optical module is inserted into cage 10 before packing, but the optical module could come off cage 10 and be damaged during transportation unless the optical module is locked in cage 10. In addition, if the optical module is packed with connection port 2 of case 1 being left open, fine dust possibly produced from a packing material and the like during transportation could stick to the optical unit (not shown) within the optical module, possibly inhibiting the optical module from normally operating. Therefore, the optical module is preferably packed after it is locked in cage 10 with connection port 2 being closed.

The optical module of this embodiment can be locked in cage 10 with connection port 2 being closed by inserting the optical module into cage 10, and connecting to connection port 2 dust cap 30 which has the same shape as connector 15 (see FIG. 10 or the like) of the type connected to connection port 2. By thus assembling the optical module and cage into a single piece before distribution, it is possible to prevent the optical module from coming off cage 10 to be damaged during transportation, and to prevent fine dust possibly produced from a packing material from sticking to the optical unit (not shown) within the optical module during transportation to inhibit the optical module from normally operating.

Also, when dust cap 30 is inserted into connection port 2 of an unused optical module, to which optical fiber connector 15 is not connected, among optical modules mounted in associated cages 10 of a communication device or the like, dust cap 30 functions as a stopper for preventing the optical module from dropping from the communication device or the like.

While preferred embodiments of the present invention have been described using specific terms, such description is for illustrative purposes only, and it is to be understood that changes and variations may be made without departing from the spirit or scope of the following claims.

What is claimed is:

1. An optical module comprising:
   a case for containing elements for making optical communications, said case having a connection port for connection with a connector, said connector being within said connection port; and
   a locking member connected to said case for locking said case in a cage for accommodating said case,
   wherein said locking member comprises an urging member forcing said locking member into an unlocked position in response to disconnecting said connector from said connection port, so that said case is unlocked from said cage without removing said case from said cage.

2. The optical module according to claim 1, wherein said locking member comprises:
   a shaft rotatably supported by said case;
   a first section positioned on one side of said shaft; and
   a second section positioned on another side of said shaft, said second section including a latch for retention by a retaining hole formed in said cage,
   wherein said locking member is configured to pivotally move about said shaft as said first section is moved in a first direction in which said first section is further away from said case, causing said latch retained in said retaining hole to come off said retaining hole.

3. The optical module according to claim 2, wherein said urging member urges said first section in said first direction.

4. The optical module according to claim 1, wherein said locking member is configured to act within a recessed groove space formed in said case.

5. The optical module according to claim 2, wherein said urging member comprises a spring member.

6. The optical module according to claim 5, wherein said locking member is separately or integrally formed with said spring member.

7. The optical module according to claim 6, wherein said spring member and said locking member are made of a resin material.

8. The optical module according to claim 1, wherein said locking member is made of a metal material.

9. The optical module according to claim 3, wherein said urging member comprises a pair of magnets disposed in said case and said first section, respectively, such that the same poles oppose each other.

10. An optical module comprising:
    a case for containing elements for making optical communications, said case having a connection port for connection with an external optical fiber cable connector; and a locking member for locking said case in a cage for accommodating said case, wherein said locking member comprises:

a shaft rotatably supported by said case;

a first section positioned on one side of said shaft; and a second section positioned on another side of said shaft, said second section including a latch for retention by a retaining hole formed in said cage, and a shoulder to which said connector abuts when said connector is connected to said connection port, said locking member is configured to pivotally move about said shaft to a position at which said latch is fitted into said retaining hole as said second section is pressed by said connector in abutment to said shoulder, and said locking member is further configured to pivotally move about said shaft to a position at which said latch retained in said retaining hole comes off said retaining hole as said first section is moved in a direction in which said first section is further away from said case, and said optical module further comprises an urging member for urging said first section in the direction in which said first section is moved away from said case.

11. The optical module according to claim 10, wherein said locking member is configured to act within a recessed groove space formed in said case.

12. The optical module according to claim 10, wherein said urging member comprises a spring member.

13. The optical module according to claim 12, wherein said locking member is integrally formed with said spring member.

14. The optical module according to claim 13, wherein said spring member and said locking member are made of a resin material.

15. The optical module according to claim 10, wherein said locking member is made of a metal material.

16. The optical module according to claim 10, wherein said urging member comprises a pair of magnets disposed in said case and said first section, respectively, such that the same poles oppose each other.

17. An optical module/cage assembly comprising:

said optical module according to claim 1;

a cage having said optical module inserted therein up to a predetermined position; and a dust cap connected to said connection port formed in said optical module, said dust cap having the same shape as said connector.

18. The optical module according to claim 2, wherein said locking member and said shaft are separately or integrally formed.

* * * * *